INVENTOR.
Wallace W. Pultz

United States Patent Office 3,558,270
Patented Jan. 26, 1971

3,558,270
MACROSCOPIC FIBERS OF SPINEL
Wallace W. Pultz, Painted Post, N.Y., assignor to Corning Glass Works, Corning, N.Y., a corporation of New York
Filed Jan. 26, 1968, Ser. No. 701,018
Int. Cl. C01f 7/02
U.S. Cl. 23—52    8 Claims

ABSTRACT OF THE DISCLOSURE

This invention relates to the manufacture of macroscopic-sized fibers of spinel ($MgO \cdot Al_2O_3$) through a vapor phase interaction between MgO, $Al_2O_3$, carbon, chlorine, and $SiO_2$ wherein $SiO_2$ or SiO acts as a nucleating agent or crystallization catalyst. The interaction between the components is carried out at temperatures between about 1375°–1525° C. at partial pressures of chlorine between about 25–300 mm. of mercury.

---

The use of various inorganic fibers as reinforcing elements for plastics, rubbers, glasses, and metals has been investigated extensively in the past 30 years, particularly with glass fibers. Glass fibers, while relatively inexpensive to manufacture, have two principal characteristics which have rendered them unsuitable for certain applications, viz, their lack of resistance to chemical attack and their loss of strength when exposed to moderately high temperatures. Hence, there has been considerable research conducted to produce fibers capable of withstanding very high temperatures and chemical corrosion and of exhibiting high strength even at elevated temperatures.

Spinel ($MgO \cdot Al_2O_3$) has a melting point of 2135° C. and is quite inert toward many common chemical reagents. Therefore, it has been appreciated that fibers composed of spinel crystals would exhibit very high strength, particularly where the fiber consisted of a single crystal, would possess good chemical inertness, and would demonstrate good stability at very high temperatures. Such fibers would, therefore, be eminently useful as reinforcing elements in plastics, rubbers, glasses, and even in metals.

I have discovered that fibers containing spinel crystals in lengths up to about 25 mm., with diameters ranging from a few microns up to about 25 microns, can be manufactured through a interaction between MgO, $Al_2O_3$, carbon, and $SiO_2$ in a chlorine-containing atmosphere utilizing $SiO_2$ or SiO as a nucleating agent or crystallization catalyst. The fibers, themselves, demonstrate relatively good uniformity of diameter throughout their length except that they have sharply-pointed ends, thereby rendering them especially desirable as reinforcing elements. They are remarkably resistant to chemical attack by the common acids and alkalies and are inert to hot concentrated HF. Finally, these fibers are relatively inert to the action of water vapor or steam.

Figure 1:
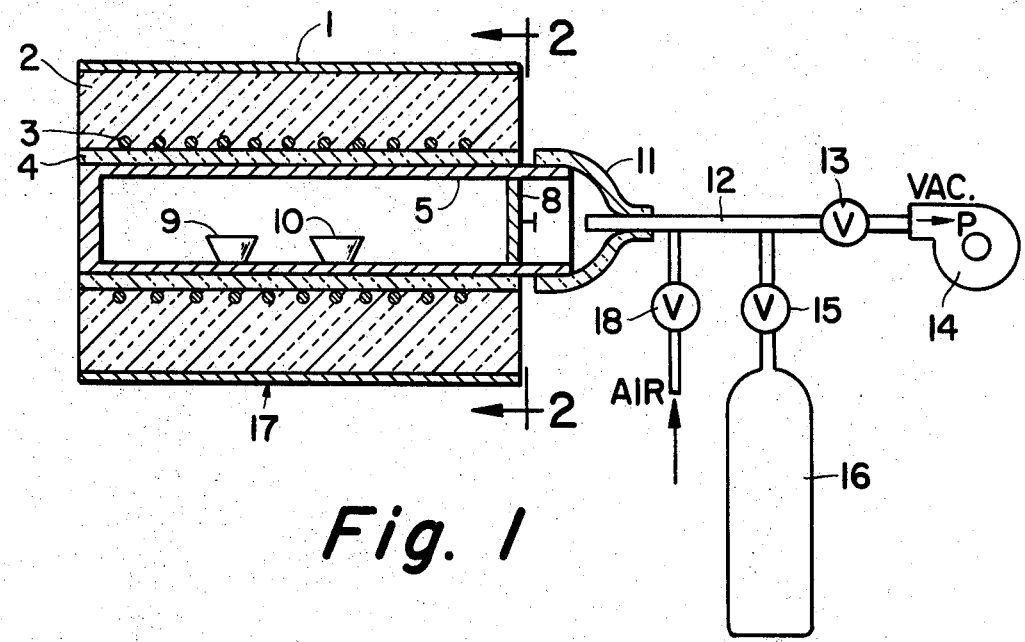
Figure 2:
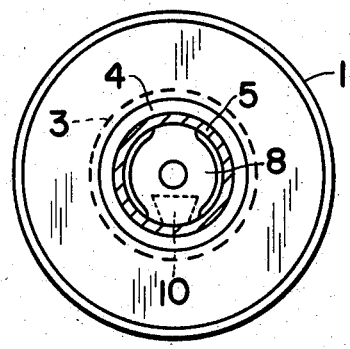

In describing the method of my invention, reference is made to the appended drawings wherein:

FIG. 1 is a diagrammatic arrangement of apparatus suitable for producing fibers containing spinel crystals; and FIG. 2 is a vertical sectional view along lines 2—2 of FIG. 1.

In general terms, my invention comprises concurrently reacting carbon and $SiO_2$ in close proximity to a charge of $Al_2O_3$ and MgO utilizing a chlorine-containing environment. Thus, a reaction charge of carbon and silica is exposed to a temperateure of about 1375°–1525° C. to produce SiO in the near vicinity of a reaction charge of $Al_2O_3$ and MgO. These two reaction charges are fired at such temperatures within an atmosphere of chlorine gas having a partial pressure ranging about 25–300 mm. of mercury for a sufficient length of time to obtain the desired growth of spinel fibers.

The mechanism leading to the production of these spinel fibers is not fully understood but laboratory experimentation has demonstrated that the presence of $SiO_2$ within the reaction system is mandatory to promote the growth of fibers. It is assumed that the SiO vapor generated by the reaction of carbon and $SiO_2$, along with any gaseous intermediate halide compound which may result from an interaction between the chlorine and the batch materials, catalyzes the reaction between the MgO and $Al_2O_3$ in some manner such that spinel growth in the form of needles rather than particulate material results. The $SiO_2$ should not directly contact the MgO lest forsterite ($MgO \cdot SiO_2$) be formed instead of spinel.

A molar ratio of carbon to silica as great as 20:1 can be successfully employed but such excessive proportions of carbon are uneconomical since large unreacted residues of carbon are left. Therefore, molar ratios of carbon to $SiO_2$ between about 1:1 to 2:1 are preferred since these proportions appear to react to give the maximum rate of SiO generation and transport, and the presence of carbon in an amount less than the molar ratio of carbon to $SiO_2$ of 1:1 will result in a residue of unreacted $SiO_2$.

Molar ratios of $MgO:Al_2O_3$ varying from about 5:1 to 1:5 can be successfully utilized for the growth of spinel fibers but the use of amounts varying from the stoichiometry of spinel merely results in unreacted residues of the ingredient present in excess. Therefore, the preferred molar ratio of $MgO:Al_2O_3$ is about 1:1.

The growth of fibers begins essentially as soon as the starting materials are exposed to the reaction temperature. Thus, a substantially continuous process for the manufacture of fibers could be devised wherein an amount of reaction ingredients would be added to the reaction zone to exactly balance the amount of fibers removed after their production. Nevertheless, in actual practice, it has been found desirable to maintain a reaction time of at least two hours to assure the growth of a good yield of fibers which can be readily removed from the reaction zone. Also, whereas the growth of these spinel fibers is certainly time and temperature dependent such that reaction times longer than 8 hours can be employed at low reaction temperatures with no apparent deleterious effect upon the quality of the fibers, the increase in fiber development after about 8 hours is not substantial so my preferred practice contemplates reaction times varying between about 2–8 hours. Also, at higher reaction temperatures, particularly, reaction times longer than about 8 hours produce dendritic growth rather than fibers of spinel.

Air in the reaction system appears to have an adverse effect upon the final yield of fibers. Thus, oxygen tends to oxidize the original carbon starting material. Therefore, whereas a minor amount of oxygen can be tolerated, its substantial elimination is much preferred. Hence, while a good yield of fibers can be attained in a dynamic system wherein a flow of chlorine gas is continued during the heating of the starting materials to the reaction temperature such that the residual air in the reaction chamber is flushed out before reaction begins, it is more economical and efficient to first draw a vacuum to an absolute pressure of not more than about 1 mm. of mercury before or during the heating to the reaction temperature.

At reaction temperatures below about 1375° C., the rate of fiber growth becomes so slow and the fiber yield so small that the process becomes commercially impractical. At temperatures above about 1525° C., dendritic growth rather than fiber growth of spinel is witnessed. Further, irregular growth and discontinuities in the fibers, themselves, are experienced.

As has been explained above, the reactions involved in this invention are temperature dependent, i.e., the fiber growth is more rapid as the temperature of reaction is raised. However, it has also been learned that high partial pressures of chlorine tend to produce dendritic growth whereas at low partial pressures of chlorine poor fiber yields are obtained.

I have found that excellent growths of fibers, both from the aspects of quality and quantity, are achieved when extremely pure starting materials are employed. However, very satisfactory yields have been produced where relatively crude raw materials are employed such as sand, charcoal, and the commercial grades of MgO and $Al_2O_3$ regularly used in the manufacture of refractory products. Likewise, chlorine gas need not be of the highest purity to yield excellent fiber growths, since technical grades thereof can be utilized with good results.

The fibers appear to be colorless and transparent. Inasmuch as fiber lengths in excess of 25 mm. with a diameter of 1–2 microns have been observed, a maximum length to diameter ratio of about 25,000:1 is present. X-ray diffraction analyses coupled with microscopic examinations, physical property measurements, and chemical analyses have identified the fibers as $MgO \cdot Al_2O_3$, spinel.

One apparatus operable for practicing my invention is depicted in the appended drawings. Thus, there is represented a furnace consisting of a refractory tube wound with wire in such a manner that a temperature gradient is set up along the length of the tube comprising the reaction chamber, the rear end thereof being the hotter end. Two refractory ceramic containers or "boats" holding the reaction charges are positioned within the refractory tube in close proximity to each other at the area where the desired reaction temperature can be obtained. The furnace is then evacuated to a pressure of less than 1 mm. of mercury, this vacuum being maintained as the temperature is raised within the reaction chamber to at least about 600° C. to insure essentially complete outgassing. The temperature within the reaction chamber is thereafter raised to the range 1375°–1525° C. in the area of the refractory boats, chlorine gas being introduced at an appropriate partial pressure. The reaction temperature is maintained for a predetermined length of time to deposit a good yield of fibers and the furnace then cooled to room temperature.

Referring now specifically to the apparatus depicted in the accompanying drawings, the gradient furnace, represented generally in side elevation in cross section at 17 consists essentially of an alumina, mullite, or sillimanite refractory tube 4 wound with platinum or platinum-rhodium alloy wire 3 surrounded with insulation 2 which is contained within a steel casing 1. The windings of the wire are spaced at predetermined distances to set up a temperature gradient along refractory tube 4, the rear end of which is the hotter inner or working liner 5, also consisting of alumina, mullite, or sillimanite refractory tube, is inserted inside tube 4 to protect that tube from mechanical injury and chemical corrosion during operation of the furnace, thereby precluding the possibility of a furnace failure resulting from the starting materials or reaction products contacting the furnace windings. The working liner 5 extends beyond the front of the furnace 17 and is there connected through a glass joint connection 11 to a pipe 12. Pipe 12 leads to a vacuum pump 14 through valve 13 or to a source of air 19 (not shown) through valve 18 or the chlorine gas may be introduced into pipe 12 through valve 15 from a lecture bottle 16. A fairly close-fitting platinum disc 8 provides a radiation shield to limit the escape of heat out of the front of working liner 5 but allows a vacuum to be drawn within the reaction chamber and the chlorine gas to be introduced therein. Refractory boat 9, containing a charge of charcoal and sand, may consist of alumina, mullite, or sillimanite whereas refractory boat 10, containing a charge of MgO and $Al_2O_3$, may consist of alumina or some other material which is not affected by the chlorine atmosphere or the reaction products, but should not contain $SiO_2$ (as does mullite and sillimanite) since, as noted above, forsterite will be formed through the reaction of MgO with the $SiO_2$. Boats 9 and 10 are placed within working liner 5 at that position where the predetermined reaction temperature can be attained.

In the following examples, boat 9 contained a charge of charcoal and acid-washed pulverized sand in the molar ratio of about 2:1 and boat 10 contained a charge of reagent grade MgO and $Al_2O_3$ in the molar ratio of about 1:1. These boats were inserted into working liner 5 at the proper position. Radiation shield 8 was placed in position. Pipe 12 was connected to working liner 5 through glass joint connection 11. The furnace was then heated up until a temperature of about 1150° C. was obtained in the area of boats 9 and 10 during which time a vacuum of about 1 mm. of mercury was drawn and maintained by pump 14. Valve 13 was then closed and valve 15 opened to permit chlorine gas from lecture bottle 16 to pass into working liner 5 at a predetermined partial pressure. The temperature within working line 5 was then raised to a desired temperature and held thereat for some predetermined length of time to cause the development and growth of fibers. Thereafter, the heat to the furnace was cut off and the furnace allowed to cool to about 400° C. at which time valve 15 was opened to permit air to enter the reaction chamber to expedite cooling thereof and restore atmospheric pressure therein. Boats 9 and 10 were removed from the furnace and the canopy of fiber growth in boat 10 examined.

Table I reports the results of various modifications in processing techniques which serve to illustrate the parameters of my invention. The apparatus utilized was that which has been described immediately above. In each instance, a molar ratio of carbon to silica of about 2:1 was utilized for the charge in boat 9 and a molar ratio of MgO to $Al_2O_3$ of about 1:1 was employed for the charge in boat 10. Examples have been included to demonstrate that an inert diluent gas may be added to the chlorine atmosphere with no apparent deleterious effect upon the fiber quality or yield. Such additions have two advantages. First, a total pressure of one atmosphere may be utilized in the reaction chamber which is useful not only in a static system for the production of fibers as described above but also in a dynamic, gas-flowing system. Second, the refractory ceramic tubes used as reaction chambers for this invention are subject to deformation and complete collapse where a high vacuum is drawn therein at temperatures higher than about 1450° C. and, therefore, to overcome this lack of mechanical strength in the refractory tubes at high temperatures, an inert gas such as helium or argon is introduced with the chlorine gas to produce a combined pressure of at least 200 mm. of mercury.

Each description of fiber growth represents an attempt to rank the quality and yield of fibers by visual observation within the arbitrary series, 1–10, wherein 10 designates the most desirable product. Experience has demonstrated that there is a direct relation between fiber yield and quality of the individual fibers, i.e., the greater the fiber yield, the better quality will be the fiber.

TABLE I

| Example No. | Partial pressure (mm.) Cl₂ | Partial pressure (mm.) He | Partial pressure (mm.) Ar | Temperature of reaction, °C. | Time, hours | Description |
|---|---|---|---|---|---|---|
| 1 | Vacuum | | | 1,400 | 5 | None. |
| 2 | | 200 | | 1,400 | 5 | None |
| 3 | | | 350 | 1,500 | 5 | None |
| 4 | 25 | | | 1,400 | 2 | 1 |
| 5 | 25 | | | 1,400 | 6 | 2 |
| 6 | 25 | | | 1,400 | 10 | (¹) |
| 7 | 50 | | | 1,400 | 2 | 2 |
| 8 | 50 | | | 1,400 | 6 | 3 |
| 9 | 50 | | | 1,400 | 10 | (¹) |
| 10 | 100 | | | 1,400 | 2 | 3 |
| 11 | 100 | | | 1,400 | 6 | 4 |
| 12 | 100 | | | 1,400 | 8 | 4 |
| 13 | 100 | | | 1,400 | 10 | (¹) |
| 14 | 200 | | | 1,400 | 2 | 3 |
| 15 | 200 | | | 1,400 | 4 | 5 |
| 16 | 200 | | | 1,400 | 8 | 5 |
| 17 | 200 | | | 1,400 | 10 | (¹) |
| 18 | 300 | | | 1,400 | 2 | 4 |
| 19 | 300 | | | 1,400 | 4 | 6 |
| 20 | 300 | | | 1,400 | 8 | ²5 |
| 21 | 300 | | | 1,400 | 10 | (¹) |
| 22 | 25 | 200 | | 1,450 | 2 | 2 |
| 23 | 25 | 200 | | 1,450 | 8 | 4 |
| 24 | 25 | 600 | | 1,450 | 2 | 2 |
| 25 | 100 | 200 | | 1,450 | 2 | 5 |
| 26 | 100 | 200 | | 1,450 | 6 | 10 |
| 27 | 100 | 200 | | 1,450 | 8 | 10 |
| 28 | 200 | 500 | | 1,450 | 2 | 6 |
| 29 | 200 | 500 | | 1,450 | 4 | 10 |
| 30 | 200 | 500 | | 1,450 | 6 | 10 |
| 31 | 300 | | | 1,450 | 2 | 5 |
| 32 | 300 | | 400 | 1,450 | 2 | 5 |
| 33 | 300 | | 400 | 1,450 | 4 | ²6 |
| 34 | 25 | 300 | | 1,500 | 2 | 3 |
| 35 | 25 | 300 | | 1,500 | 8 | 4 |
| 36 | 25 | 300 | | 1,500 | 10 | (¹) |
| 37 | 100 | 100 | | 1,500 | 2 | 6 |
| 38 | 100 | 100 | | 1,500 | 4 | 10 |
| 39 | 100 | 100 | | 1,500 | 8 | ²8 |
| 40 | 200 | | | 1,500 | 2 | 6 |
| 41 | 200 | | 200 | 1,500 | 4 | 10 |
| 42 | 200 | | 200 | 1,500 | 8 | (¹) |
| 43 | 300 | | | 1,500 | 1 | 2 |
| 44 | 300 | | | 1,500 | 2 | 4 |
| 45 | 300 | | | 1,500 | 6 | (¹) |
| 46 | 25 | | 700 | 1,525 | 2 | 4 |
| 47 | 25 | | 700 | 1,525 | 4 | ²5 |
| 48 | 100 | | 300 | 1,525 | 2 | ²7 |
| 49 | 200 | | 300 | 1,525 | 2 | ²8 |
| 50 | 200 | | 300 | 1,525 | 4 | (¹) |

¹ Dendrites.   ² Some dendrites.

This table amply delineates the process parameters of the invention. Hence, the need for a chlorine-containing atmosphere is dramatically demonstrated through Examples 1-3. The remaining examples illustrate that fiber yields of any substance cannot be produced where the partial pressure of chlorine is less than about 25 mm., a reaction time of less than about two hours is employed, or the reaction temperature is less than about 1375° C. Likewise, partial pressures of chlorine greater than about 300 mm., reaction temperatures higher than about 1525° C., or reaction times longer than about 8 hours lead to the production of spinel in the form of dendrites rather than as fibers.

The preferred embodiment of the invention comprises a reaction time of about four hours at a temperature of about 1450° C. with a partial pressure of chlorine of about 200 mm. of mercury.

It will be appreciated that modifications in the design of the apparatus as illustrated in the appended drawings and in the detailed procedural operating steps may be made without departing from the scope of the invention so long as the specified combination of temperatures, times, and chlorine-containing atmosphere is observed. Likewise, it will be further understood that although the process of the invention has been described in terms of a static system, the necessary inter-relationship of times, temperatures, and chlorine-containing atmosphere can be attained in a dynamic system through apparatus design changes. In any event, the selection of these process parameters can be readily defined by one or ordinary skill in the art within the framework of the basic description set forth above.

I claim:

1. A method for making macroscopic fibers of crystalline spinel comprising the steps of:
   (a) providing within a reaction chamber a charge of carbon and $SiO_2$ in close relation to a charge of MgO and $Al_2O_3$ but wherein the $SiO_2$ is out of direct contact with said MgO;
   (b) exposing said charges to a temperature between about 1375°–1525° C. within an atmosphere containing chlorine gas having a pressure between about 25–300 mm. mercury;
   (c) maintaining said temperature and atmosphere for a period of time sufficient to obtain the desired fiber formation; and then
   (d) cooling said fibers to room temperature.

2. A method in accordance with claim 1 wherein said atmosphere consists of a mixture of chlorine gas and an inert gas.

3. A method in accordance with claim 2 wherein said inert gas consists of helium or argon.

4. A method in accordance with claim 1 wherein said period of time sufficient to obtain the desired fiber formation ranges about 2–8 hours.

5. A method in accordance with claim 1 wherein said reaction chamber is evacuated to an absolute pressure of not more than about 1 mm. mercury before said charges are exposed to the atmosphere containing chlorine gas.

6. A method in accordance with claim 5 wherein said atmosphere consists of a mixture of chlorine gas and an inert gas.

7. A method in accordance with claim 6 wherein said inert gas consists of helium or argon.

8. A method in accordance with claim 5 wherein said period of time sufficient to obtain the desired fiber formation ranges about 2–8 hours.

References Cited

UNITED STATES PATENTS 3,083,123   3/1963   Navias _____ 23—52X
3,304,153   2/1967   Bakkar et al. _____ 23—52
3,457,033   7/1969   Gatti et al. _____ 23—52

HERBERT T. CARTER, Primary Examiner